(12) United States Patent
Henry et al.

(10) Patent No.: US 10,225,840 B2
(45) Date of Patent: *Mar. 5, 2019

(54) BACKHAUL LINK FOR DISTRIBUTED ANTENNA SYSTEM

(71) Applicant: AT&T Intellectual Property I, L.P., Atlanta, GA (US)

(72) Inventors: Paul Shala Henry, Holmdel, NJ (US); Donald J. Barnickel, Flemington, NJ (US); Farhad Barzegar, Branchburg, NJ (US); George Blandino, Bridgewater, NJ (US); Irwin Gerszberg, Kendall Park, NJ (US); Thomas M. Willis, III, Tinton Falls, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/698,421

(22) Filed: Sep. 7, 2017

(65) Prior Publication Data

US 2017/0374666 A1    Dec. 28, 2017

Related U.S. Application Data

(63) Continuation of application No. 15/156,465, filed on May 17, 2016, now Pat. No. 9,788,326, which is a (Continued)

(51) Int. Cl.
*H04L 1/00* (2006.01)
*H04W 72/04* (2009.01)
(Continued)

(52) U.S. Cl.
CPC .......... *H04W 72/0453* (2013.01); *H04B 3/38* (2013.01); *H04B 3/52* (2013.01);
(Continued)

(58) Field of Classification Search
CPC ....... H04L 12/2836; H04B 3/542; H04B 3/54; H04B 2203/5445; H04B 2203/5441; H04B 3/38; H04B 3/52; H04W 72/0453
(Continued)

(56) References Cited

U.S. PATENT DOCUMENTS 2,685,068 A    7/1954 Goubau
2,852,753 A    9/1958 Gent et al.
(Continued)

FOREIGN PATENT DOCUMENTS

WO    20170214162    12/2017
WO    2018106455 A1    6/2018
(Continued)

OTHER PUBLICATIONS

PCT/US17/36172, International Search Report and Written Opinion dated Aug. 25, 2017, 15 Pages.
(Continued)

*Primary Examiner* — Phuoc H Doan
(74) *Attorney, Agent, or Firm* — Guntin & Gust, PLC; Mark Wilinski

(57) ABSTRACT

A distributed antenna and backhaul system provide network connectivity for a small cell deployment. Rather than building new structures, and installing additional fiber and cable, embodiments described herein disclose using high-bandwidth, millimeter-wave communications and existing power line infrastructure. Above ground backhaul connections via power lines and line-of-sight millimeter-wave band signals as well as underground backhaul connections via buried electrical conduits can provide connectivity to the distributed base stations. An overhead millimeter-wave system can also be used to provide backhaul connectivity. Modules can be placed onto existing infrastructure, such as streetlights and utility poles, and the modules can contain base stations and antennas to transmit the millimeter-waves to and from other modules.

20 Claims, 11 Drawing Sheets

Related U.S. Application Data continuation of application No. 14/788,994, filed on Jul. 1, 2015, now Pat. No. 9,699,785, which is a continuation of application No. 14/274,638, filed on May 9, 2014, now Pat. No. 9,119,127, which is a continuation of application No. 13/705,690, filed on Dec. 5, 2012, now Pat. No. 9,113,347.

(51) Int. Cl.
| | |
|---|---|
| H04B 3/54 | (2006.01) |
| H04W 24/02 | (2009.01) |
| H04B 3/52 | (2006.01) |
| H04W 36/22 | (2009.01) |
| H04B 3/56 | (2006.01) |
| H04B 10/2575 | (2013.01) |
| H04W 16/26 | (2009.01) |
| H04B 7/04 | (2017.01) |
| H04L 29/06 | (2006.01) |
| H04B 3/38 | (2006.01) |
| H02J 13/00 | (2006.01) |
| H04W 84/04 | (2009.01) |

(52) U.S. Cl.
CPC ............... *H04B 3/54* (2013.01); *H04B 3/542* (2013.01); *H04B 3/56* (2013.01); *H04B 7/04* (2013.01); *H04B 10/25759* (2013.01); *H04L 69/08* (2013.01); *H04W 16/26* (2013.01); *H04W 24/02* (2013.01); *H04W 36/22* (2013.01); *H02J 13/002* (2013.01); *H02J 13/0082* (2013.01); *H04B 2203/5441* (2013.01); *H04B 2203/5479* (2013.01); *H04W 84/045* (2013.01); *H04W 84/047* (2013.01)

(58) Field of Classification Search
USPC ........... 455/41.2; 398/76; 375/260; 370/252, 370/329
See application file for complete search history.

(56) References Cited

U.S. PATENT DOCUMENTS

| | | | |
|---|---|---|---|
| 2,867,776 | A | 1/1959 | Wilkinson, Jr. |
| 2,912,695 | A | 11/1959 | Cutler |
| 2,921,277 | A | 1/1960 | Goubau |
| 3,201,724 | A | 8/1965 | Hafner |
| 3,566,317 | A | 2/1971 | Hafner |
| 5,889,449 | A | 3/1999 | Fiedziuszko |
| 5,890,055 | A | 3/1999 | Chu et al. |
| 6,239,377 | B1 | 5/2001 | Nishikawa et al. |
| 7,009,471 | B2 | 3/2006 | Elmore |
| 7,043,271 | B1 | 5/2006 | Seto et al. |
| 7,280,033 | B2 | 10/2007 | Berkman et al. |
| 7,345,623 | B2 | 3/2008 | McEwan et al. |
| 7,567,154 | B2 | 7/2009 | Elmore |
| 7,590,404 | B1 | 9/2009 | Johnson et al. |
| 7,634,250 | B1 | 12/2009 | Prasad et al. |
| 8,159,385 | B2 | 4/2012 | Farneth et al. |
| 8,212,635 | B2 | 7/2012 | Miller, II et al. |
| 8,237,617 | B1 | 8/2012 | Johnson et al. |
| 8,253,516 | B2 | 8/2012 | Miller, II et al. |
| 8,269,583 | B2 | 9/2012 | Miller, II et al. |
| 8,344,829 | B2 | 1/2013 | Miller, II et al. |
| 8,736,502 | B1 | 5/2014 | Mehr et al. |
| 8,897,697 | B1 | 11/2014 | Bennett et al. |
| 9,113,347 | B2 | 8/2015 | Henry |
| 9,209,902 | B2 | 12/2015 | Willis, III et al. |
| 9,312,919 | B1 | 4/2016 | Barzegar et al. |
| 9,461,706 | B1 | 10/2016 | Bennett et al. |
| 9,490,869 | B1 | 11/2016 | Henry |
| 9,509,415 | B1 | 11/2016 | Henry et al. |
| 9,520,945 | B2 | 12/2016 | Gerszberg et al. |
| 9,525,524 | B2 | 12/2016 | Barzegar et al. |
| 9,544,006 | B2 | 1/2017 | Henry et al. |
| 9,564,947 | B2 | 2/2017 | Stuckman et al. |
| 9,577,306 | B2 | 2/2017 | Willis, III et al. |
| 9,608,692 | B2 | 3/2017 | Willis, III et al. |
| 9,608,740 | B2 | 3/2017 | Henry et al. |
| 9,615,269 | B2 | 4/2017 | Henry et al. |
| 9,627,768 | B2 | 4/2017 | Henry et al. |
| 9,628,116 | B2 | 4/2017 | Willis III et al. |
| 9,640,850 | B2 | 5/2017 | Henry et al. |
| 9,653,770 | B2 | 5/2017 | Henry et al. |
| 9,680,670 | B2 | 6/2017 | Henry et al. |
| 9,692,101 | B2 | 6/2017 | Henry et al. |
| 9,705,561 | B2 | 7/2017 | Henry et al. |
| 9,705,571 | B2 | 7/2017 | Gerszberg et al. |
| 9,742,462 | B2 | 8/2017 | Bennett et al. |
| 9,748,626 | B2 | 8/2017 | Henry et al. |
| 9,749,053 | B2 | 8/2017 | Henry et al. |
| 9,722,318 | B2 | 9/2017 | Adriazola et al. |
| 9,768,833 | B2 | 9/2017 | Fuchs et al. |
| 9,769,020 | B2 | 9/2017 | Henry et al. |
| 9,780,834 | B2 | 10/2017 | Henry et al. |
| 9,793,951 | B2 | 10/2017 | Henry et al. |
| 9,793,954 | B2 | 10/2017 | Bennett et al. |
| 9,847,566 | B2 | 12/2017 | Henry et al. |
| 9,853,342 | B2 | 12/2017 | Henry et al. |
| 9,860,075 | B1 | 1/2018 | Gerszberg et al. |
| 9,865,911 | B2 | 1/2018 | Henry et al. |
| 9,866,309 | B2 | 1/2018 | Bennett et al. |
| 9,871,282 | B2 | 1/2018 | Henry et al. |
| 9,871,283 | B2 | 1/2018 | Henry et al. |
| 9,876,264 | B2 | 1/2018 | Barnickel et al. |
| 9,876,570 | B2 | 1/2018 | Henry et al. |
| 9,876,605 | B1 | 1/2018 | Henry et al. |
| 9,882,257 | B2 | 1/2018 | Henry et al. |
| 9,893,795 | B1 | 2/2018 | Willis et al. |
| 9,912,381 | B2 | 3/2018 | Bennett et al. |
| 9,917,341 | B2 | 3/2018 | Henry et al. |
| 9,991,580 | B2 | 6/2018 | Henry et al. |
| 9,997,819 | B2 | 6/2018 | Bennett et al. |
| 9,998,172 | B1 | 6/2018 | Barzegar et al. |
| 9,998,870 | B1 | 6/2018 | Bennett et al. |
| 9,999,038 | B2 | 6/2018 | Barzegar et al. |
| 2004/0113756 | A1 | 6/2004 | Mollenkopf et al. |
| 2005/0042989 | A1 | 2/2005 | Ho et al. |
| 2005/0258920 | A1 | 11/2005 | Elmore et al. |
| 2006/0111047 | A1 | 5/2006 | Louberg et al. |
| 2008/0064331 | A1 | 3/2008 | Washiro et al. |
| 2008/0113616 | A1 | 5/2008 | Kim et al. |
| 2008/0211727 | A1 | 9/2008 | Elmore et al. |
| 2008/0252541 | A1 | 10/2008 | Diaz et al. |
| 2008/0279292 | A1 | 11/2008 | Tanabe et al. |
| 2009/0079660 | A1 | 3/2009 | Elmore et al. |
| 2009/0109981 | A1 | 4/2009 | Keselman |
| 2009/0258652 | A1 | 10/2009 | Lambert et al. |
| 2010/0090887 | A1 | 4/2010 | Cooper et al. |
| 2010/0159823 | A1 | 6/2010 | Smith et al. |
| 2010/0225426 | A1 | 9/2010 | Unger et al. |
| 2010/0277003 | A1 | 11/2010 | Von Novak et al. |
| 2010/0284446 | A1 | 11/2010 | Mu et al. |
| 2011/0053498 | A1 | 3/2011 | Nogueira-Nine |
| 2011/0110404 | A1 | 5/2011 | Washiro |
| 2011/0132658 | A1 | 6/2011 | Miller, II et al. |
| 2011/0187578 | A1 | 8/2011 | Farneth et al. |
| 2012/0154239 | A1 | 6/2012 | Bar-Sade et al. |
| 2013/0064311 | A1 | 3/2013 | Turner et al. |
| 2014/0285277 | A1 | 9/2014 | Herbsommer et al. |
| 2015/0304045 | A1 | 10/2015 | Henry et al. |
| 2016/0080839 | A1 | 3/2016 | Fuchs et al. |
| 2016/0112093 | A1 | 4/2016 | Barzegar |
| 2016/0164571 | A1 | 6/2016 | Bennett et al. |
| 2016/0182096 | A1 | 6/2016 | Panioukov et al. |
| 2016/0261311 | A1 | 9/2016 | Henry et al. |
| 2016/0278094 | A1 | 9/2016 | Henry et al. |
| 2016/0315662 | A1 | 10/2016 | Henry |
| 2016/0323015 | A1 | 11/2016 | Henry et al. |
| 2016/0359541 | A1 | 12/2016 | Bennett |
| 2016/0359546 | A1 | 12/2016 | Bennett |
| 2016/0359547 | A1 | 12/2016 | Bennett |
| 2016/0360533 | A1 | 12/2016 | Bennett et al. |

(56) References Cited

U.S. PATENT DOCUMENTS

| | | |
|---|---|---|
| 2016/0365966 A1 | 12/2016 | Bennett et al. |
| 2017/0012667 A1 | 1/2017 | Bennett |
| 2017/0018856 A1 | 1/2017 | Henry et al. |
| 2017/0033465 A1 | 2/2017 | Henry et al. |
| 2017/0033953 A1 | 2/2017 | Henry et al. |
| 2017/0033954 A1 | 2/2017 | Henry et al. |
| 2017/0079037 A1 | 3/2017 | Gerszberg et al. |
| 2017/0079038 A1 | 3/2017 | Gerszberg et al. |
| 2017/0079039 A1 | 3/2017 | Gerszberg et al. |
| 2017/0085003 A1 | 3/2017 | Johnson et al. |
| 2017/0093693 A1 | 3/2017 | Barzegar et al. |
| 2017/0110795 A1 | 4/2017 | Henry |
| 2017/0110804 A1 | 4/2017 | Henry et al. |
| 2017/0111805 A1 | 4/2017 | Barzegar et al. |
| 2017/0229782 A1 | 8/2017 | Adriazola et al. |
| 2017/0265196 A1 | 9/2017 | Henry et al. |
| 2018/0048497 A1 | 2/2018 | Henry et al. |
| 2018/0054232 A1 | 2/2018 | Henry et al. |
| 2018/0054233 A1 | 2/2018 | Henry et al. |
| 2018/0054234 A1 | 2/2018 | Stuckman et al. |
| 2018/0062886 A1 | 3/2018 | Paul et al. |
| 2018/0069594 A1 | 3/2018 | Henry et al. |
| 2018/0069731 A1 | 3/2018 | Henry et al. |
| 2018/0076982 A1 | 3/2018 | Henry et al. |
| 2018/0076988 A1 | 3/2018 | Willis, III et al. |
| 2018/0077709 A1 | 3/2018 | Gerszberg |
| 2018/0108997 A1 | 4/2018 | Henry et al. |
| 2018/0108998 A1 | 4/2018 | Henry et al. |
| 2018/0108999 A1 | 4/2018 | Henry et al. |
| 2018/0115040 A1 | 4/2018 | Bennett et al. |
| 2018/0115058 A1 | 4/2018 | Henry et al. |
| 2018/0115060 A1 | 4/2018 | Bennett et al. |
| 2018/0115075 A1 | 4/2018 | Bennett et al. |
| 2018/0115081 A1 | 4/2018 | Johnson et al. |
| 2018/0123207 A1 | 5/2018 | Henry et al. |
| 2018/0123208 A1 | 5/2018 | Henry et al. |
| 2018/0123643 A1 | 5/2018 | Henry et al. |
| 2018/0123836 A1 | 5/2018 | Henry et al. |
| 2018/0151957 A1 | 5/2018 | Bennett et al. |
| 2018/0159195 A1 | 6/2018 | Henry et al. |
| 2018/0159196 A1 | 6/2018 | Henry et al. |
| 2018/0159197 A1 | 6/2018 | Henry et al. |
| 2018/0159228 A1 | 6/2018 | Britz et al. |
| 2018/0159229 A1 | 6/2018 | Britz |
| 2018/0159230 A1 | 6/2018 | Henry et al. |
| 2018/0159232 A1 | 6/2018 | Henry et al. |
| 2018/0159235 A1 | 6/2018 | Wolniansky |
| 2018/0159238 A1 | 6/2018 | Wolniansky |
| 2018/0159240 A1 | 6/2018 | Henry et al. |
| 2018/0159243 A1 | 6/2018 | Britz et al. |
| 2018/0166761 A1 | 6/2018 | Henry et al. |
| 2018/0166784 A1 | 6/2018 | Johnson et al. |
| 2018/0166785 A1 | 6/2018 | Henry et al. |
| 2018/0166787 A1 | 6/2018 | Johnson et al. |
| 2018/0167130 A1 | 6/2018 | Vannucci |
| 2018/0167927 A1 | 6/2018 | Beattie, Jr. et al. |

FOREIGN PATENT DOCUMENTS

| | | |
|---|---|---|
| WO | 2018106684 A1 | 6/2018 |
| WO | 2018106915 A1 | 6/2018 |

OTHER PUBLICATIONS

Akalin, Tahsin et al., "Single-Wire Transmission Lines at Terahertz Frequencies", IEEE Transactions on Microwave Theory and Techniques, vol. 54, No. 6, 2006, 2762-2767.

Barlow, H. M. et al., "Surface Waves", 621.396.11 : 538.566, Paper No. 1482 Radio Section, 1953, pp. 329-341.

Corridor Systems, "A New Approach to Outdoor DAS Network Physical Layer Using E-Line Technology", Mar. 2011, 5 pages.

Goubau, Georg et al., "Investigation of a Surface-Wave Line for Long Distance Transmission", 1952, 263-267.

Goubau, Georg et al., "Investigations with a Model Surface Wave Transmission Line", IRE Transactions on Antennas and Propagation, 1957, 222-227.

Goubau, Georg , "Open Wire Lines", IRE Transactions on Microwave Theory and Techniques, 1956, 197-200.

Goubau, Georg , "Single-Conductor Surface-Wave Transmission Lines", Proceedings of the I.R.E., 1951, 619-624.

Goubau, Georg , "Surface Waves and Their Application to Transmission Lines", Radio Communication Branch, Coles Signal Laboratory, Mar. 10, 1950, 1119-1128.

Goubau, Georg , "Waves on Interfaces", IRE Transactions on Antennas and Propagation, Dec. 1959, 140-146.

Ren-Bin, Zhong et al., "Surface plasmon wave propagation along single metal wire", Chin. Phys. B, vol. 21, No. 11, May 2, 2012, 9 pages.

Sommerfeld, A. , "On the propagation of electrodynamic waves along a wire", Annals of Physics and Chemistry New Edition, vol. 67, No. 2, 1899, 72 pages.

Wang, Kanglin , "Dispersion of Surface Plasmon Polaritons on Metal Wires in the Terahertz Frequency Range", Physical Review Letters, PRL 96, 157401, 2006, 4 pages.

Zelby, Leon W. , "Propagation Modes on a Dielectric Coated Wire", Journal of the Franklin Institute, vol. 274(2), Aug. 1962, pp. 85-97.

U.S. Appl. No. 10/003,364, filed Jun. 2018, Willis, III et al.

U.S. Appl. No. 10/009,063, filed Jun. 26, 2018, Gerszberg, Irwin et al.

U.S. Appl. No. 10/090,065, filed Jun. 26, 2018, Henry, Paul S., et al.

U.S. Appl. No. 10/009,901, filed Jun. 26, 2018, Gerszberg, Irwin.

U.S. Appl. No. 10/027,397, filed Jul. 17, 2018, Kim, Byoung-jo J.

U.S. Appl. No. 10/027,427, filed Jul. 17, 2018, Vannucci, Giovanni et al.

U.S. Appl. No. 10/033,107, filed Jul. 24, 2018, Henry, Paul S., et al.

U.S. Appl. No. 10/033,108, filed Jul. 24, 2018, Henry, Paul S., et al.

U.S. Appl. No. 10/044,409, filed Aug. 7, 2018, Barzegar, Farhad et al.

U.S. Appl. No. 10,051,488, filed Aug. 14, 2018, Vannucci, Giovanni et al.

Article 34 Amendment for PCT/US2017/036172 filed, Apr. 10, 2018.

International Preliminary Report on Patentability for PCT/US17/36172 dated May 10, 2018.

"International Search Report and Written Opinion", PCT/US2018/015634, dated Jun. 25, 2018, 8 pages.

Alam, M. N. et al., "Novel Surface Wave Exciters for Power Line Fault Detection and Communications", Department of Electrical Engineering, University of South Carolina, Antennas and Propagation (APSURSI), 2011 IEEE International Symposium, IEEE, 2011, 1-4.

Elmore, Glenn et al., "A Surface Wave Transmission Line", QEX, May/Jun. 2012, pp. 3-9.

Elmore, Glenn , "Introduction to the Propagating Wave on a Single Conductor", www.corridor.biz, Jul. 27, 2009, 30 pages.

Friedman, M et al., "Low-Loss RF Transport Over Long Distances", IEEE Transactions on Microwave Theory and Techniques, vol. 49, No. 2, Feb. 2001, 8 pages.

Wang, Hao et al., "Dielectric Loaded Substrate Integrated Waveguide (SIW)—Plan Horn Antennas", IEEE Transactions on Antennas and Propagation, IEEE Service Center, Piscataway, NJ, US, vol. 56, No. 3, Mar. 1, 2010, 640-647.

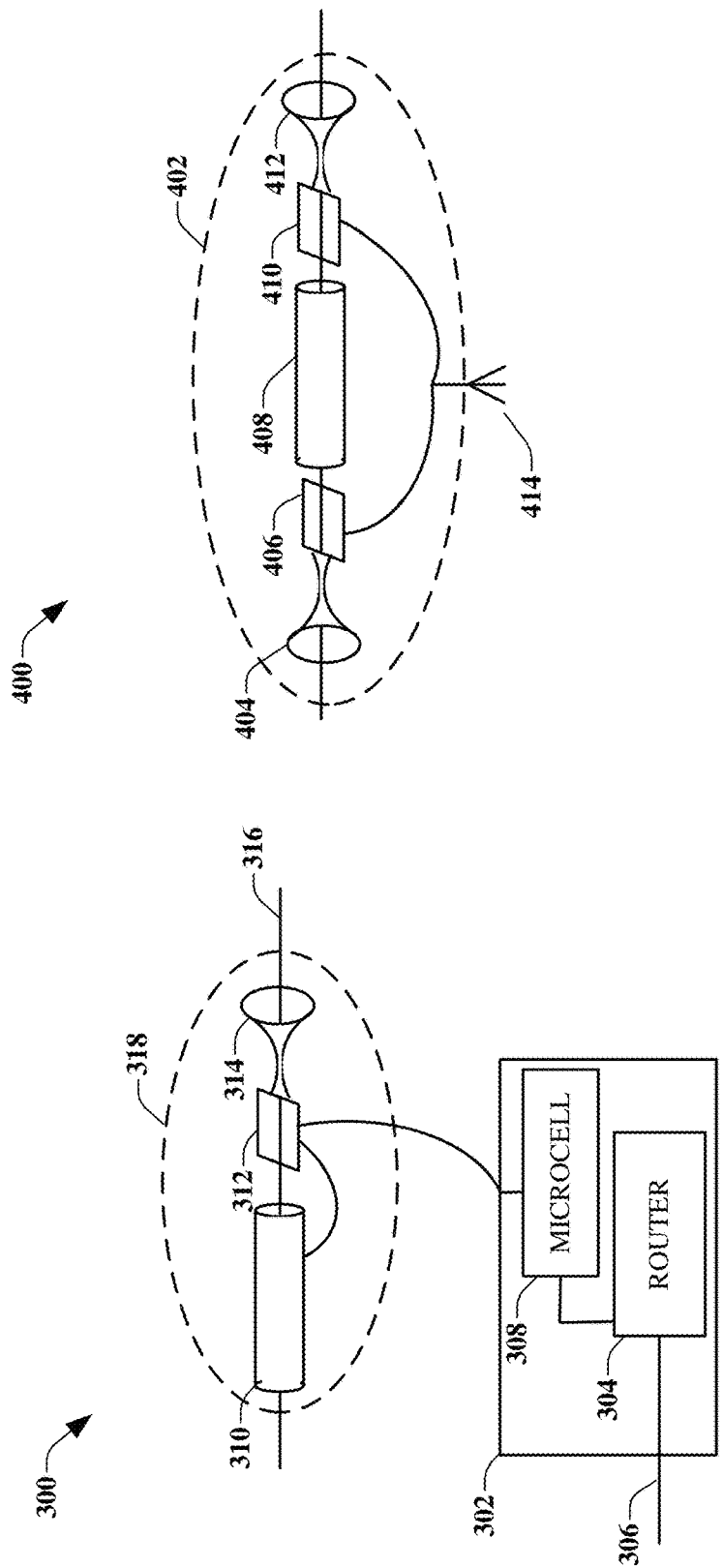

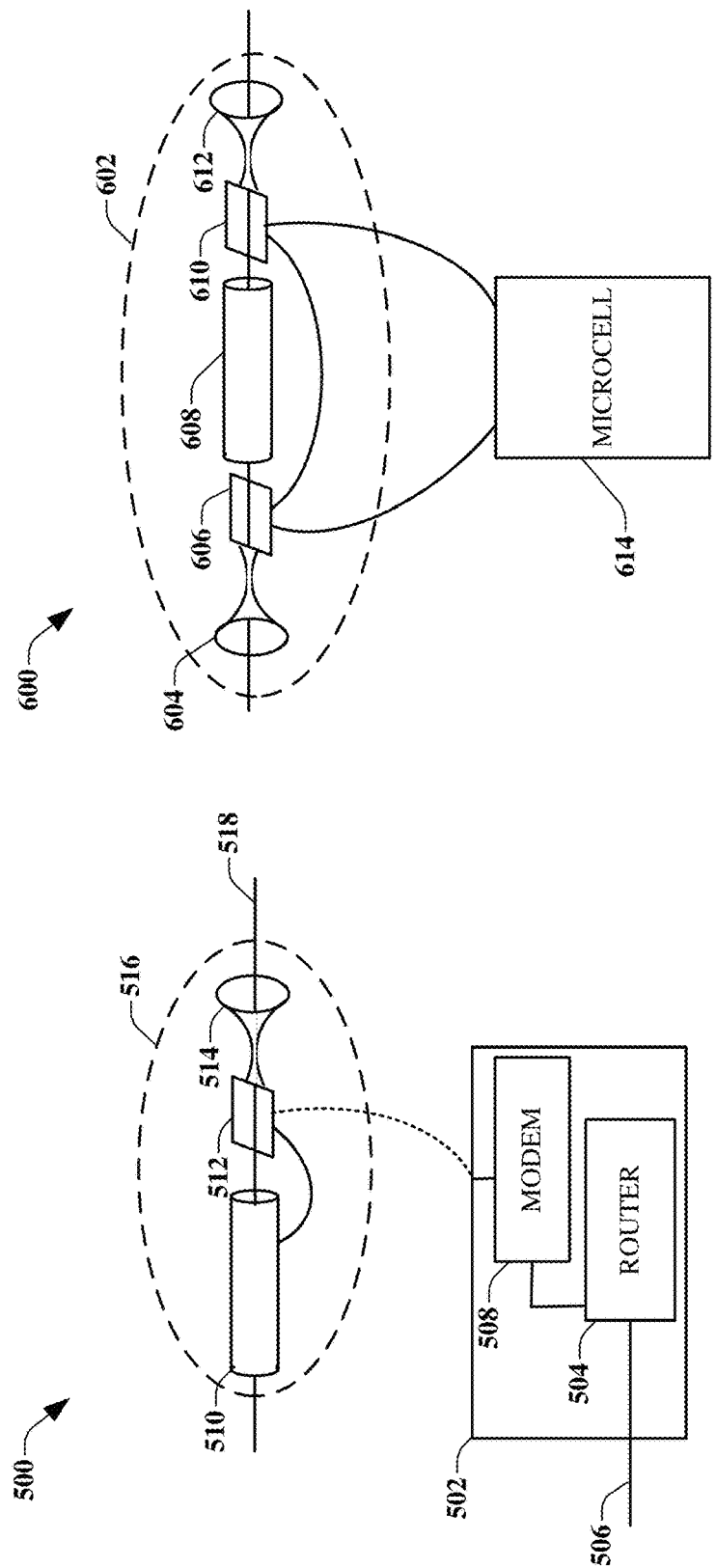

BACKHAUL LINK FOR DISTRIBUTED ANTENNA SYSTEM

CROSS-REFERENCE TO RELATED APPLICATION

This application is a continuation of and claims priority to U.S. patent application Ser. No. 15/156,465, filed May 17, 2016, which is a continuation of and claims priority to U.S. patent application Ser. No. 14/788,994, filed Jul. 1, 2015 (now U.S. Pat. No. 9,699,785), which is a continuation of and claims priority to U.S. patent application Ser. No. 14/274,638, filed May 9, 2014 (now U.S. Pat. No. 9,119,127), which is a continuation of and claims priority to U.S. patent application Ser. No. 13/705,690, filed Dec. 5, 2012 (now U.S. Pat. No. 9,113,347). All sections of the aforementioned applications are incorporated by reference herein in their entirety.

TECHNICAL FIELD

The subject disclosure relates to wireless communications and more particularly to providing backhaul connectivity to distributed antennas and base stations.

BACKGROUND

As smart phones and other portable devices increasingly become ubiquitous, and data usage skyrockets, macrocell base stations and existing wireless infrastructure are being overwhelmed. To provide additional mobile bandwidth, small cell deployment is being pursued, with microcells and picocells providing coverage for much smaller areas than traditional macrocells, but at high expense.

BRIEF DESCRIPTION OF THE DRAWINGS

FIG. 3 is a block diagram illustrating an example, non-limiting embodiment of a distributed antenna system in accordance with various aspects described herein.

FIG. 4 is a block diagram illustrating an example, non-limiting embodiment of a distributed antenna system in accordance with various aspects described herein.

FIG. 5 is a block diagram illustrating an example, non-limiting embodiment of a backhaul system in accordance with various aspects described herein.

FIG. 6 is a block diagram illustrating an example, non-limiting embodiment of a backhaul system in accordance with various aspects described herein.

DETAILED DESCRIPTION

Figure 1:
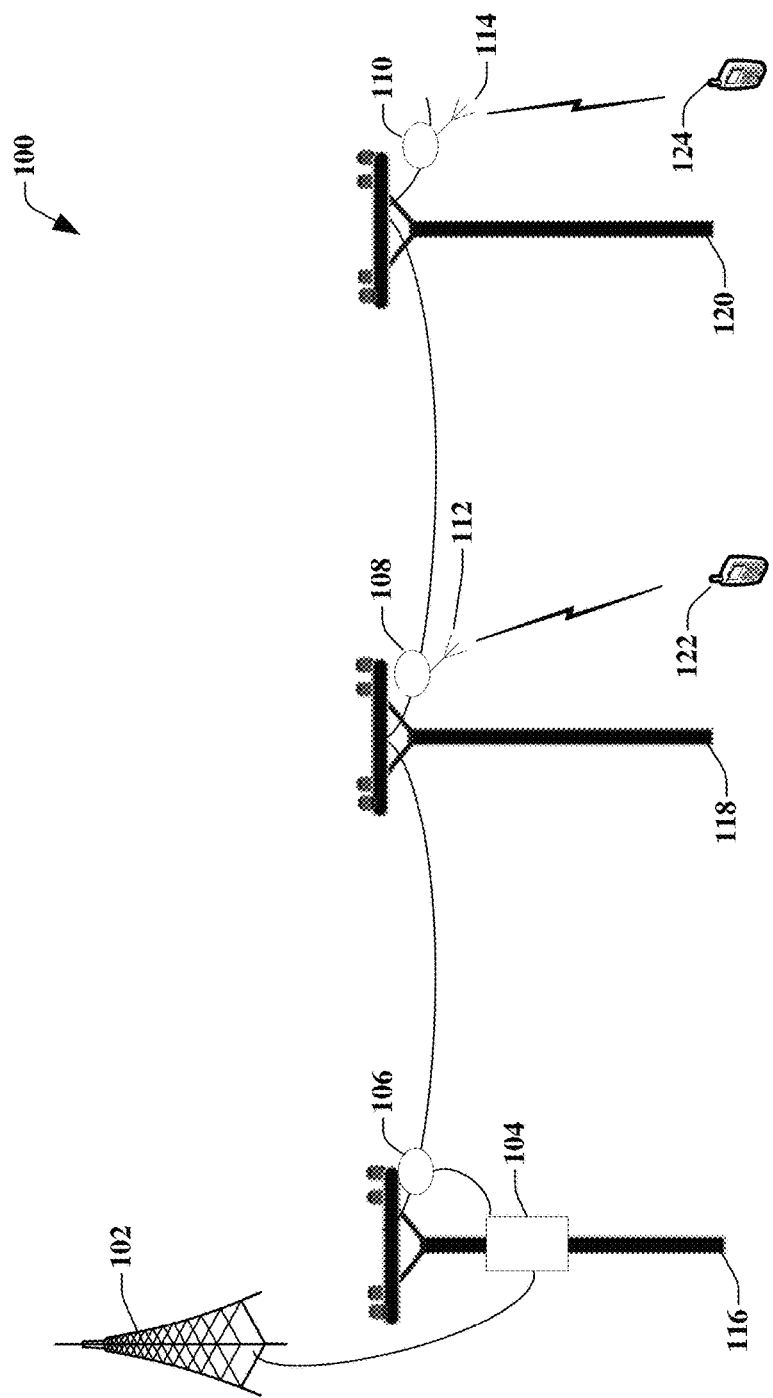
FIG. 1 is a block diagram illustrating an example, non-limiting embodiment of a distributed antenna system in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

To provide network connectivity to additional base stations, the backhaul network that links the microcells and macrocells to the mobile network correspondingly expands. Providing a wireless backhaul connection is difficult due to the limited bandwidth available at commonly used frequencies. Fiber and cable have bandwidth, but installing the connections can be cost prohibitive due to the distributed nature of small cell deployment.

For these considerations as well as other considerations, in one or more embodiments, a system includes a memory to store instructions and a processor, communicatively coupled to the memory to facilitate execution of the instructions to perform operations including facilitating receipt of a first guided wave received via a power line and converting the first guided wave to an electronic transmission. The operations also include facilitating transmission of an electronic signal determined from the electronic transmission to a base station device. The operations can also include converting the electronic transmission into a second guided wave, and facilitating transmission of the second guided wave via the power line.

Another embodiment includes a memory to store instructions and a processor, communicatively coupled to the memory to facilitate execution of the instructions to perform operations including facilitating receipt of a first transmission from a first radio repeater device. The operations can include directing a second transmission to a second radio repeater device wherein the first and second transmissions are at a frequency of at least about 57 GHz. The operations also include determining an electronic signal from the first transmission and directing the electronic signal to a base station device.

In another embodiment, a method includes receiving, by a device including a processor, a first surface wave transmission via a power line and converting the first surface wave transmission into an electronic transmission. The method can also include extracting a communication signal from the electronic transmission and sending the communication signal to a base station device. The method can also include transmitting the electronic transmission as a second surface wave transmission over the power line wherein the first surface wave transmission and the second surface wave transmission are at a frequency of at least 30 GHz.

Various embodiments described herein relate to a system that provides a distributed antenna system for a small cell deployment and/or a backhaul connection for a small cell deployment. Rather than building new structures, and installing additional fiber and cable, embodiments described herein disclose using high-bandwidth, millimeter-wave communications and existing power line infrastructure. Above ground backhaul connections via power lines and line of sight millimeter-wave band signals as well as underground backhaul connections via buried electrical conduits can provide connectivity to the distributed base stations.

In an embodiment, an overhead millimeter-wave system can be used to provide backhaul connectivity. Modules can be placed onto existing infrastructure, such as streetlights and utility poles, and the modules can contain base stations and antennas to transmit the millimeter waves to and from other modules. One of the modules, or nodes, in the network can be communicably coupled, either by fiber/cable, or by a standard 57-64 GHz line-of-sight microwave connection to a macrocell site that is physically connected to the mobile network.

In another embodiment, base station nodes can be installed on utility poles, and the backhaul connection can be provided by transmitters that send millimeter-wave band surface wave transmissions via the power lines between nodes. A single site with one or more base stations can also be connected via the surface wave transmission over power lines to a distributed antenna system, with cellular antennas located at the nodes. In another embodiment, underground conduits can be used to transmit guided waves, with the waves propagating in the empty space between the conduit and the power lines. Signal extractors and base stations can be placed in existing transformer boxes.

Turning now to FIG. 1, illustrated is an example, non-limiting embodiment of a distributed antenna system 100 in accordance with various aspects described herein.

Distributed antenna system 100 includes one or more base stations (e.g., base station device 104) that are communicably coupled to a macrocell site 102. Base station device 104 can be connected by fiber and/or cable, or by a microwave wireless connection to macrocell site 102. Macrocells such as macrocell site 102 can have dedicated connections to the mobile network and base station device 104 can piggy back off of macrocell site 102's connection. Base station device 104 can be mounted on, or attached to, utility pole 116. In other embodiments, base station device 104 can be near transformers and/or other locations situated nearby a power line.

Base station device 104 can provide connectivity for mobile devices 122 and 124. Antennas 112 and 114, mounted on or near utility poles 118 and 120 can receive signals from base station device 104 and transmit those signals to mobile devices 122 and 124 over a much wider area than if the antennas 112 and 114 were located at or near base station device 104.

It is to be appreciated that FIG. 1 displays three utility poles, with one base station device, for purposes of simplicity. In other embodiments, utility pole 116 can have more base station devices, and one or more utility poles with distributed antennas are possible.

A launcher 106 can transmit the signal from base station device 104 to antennas 112 and 114 over a power line(s) that connect the utility poles 116, 118, and 120. To transmit the signal, launcher 106 upconverts the signal from base station device 104 to a millimeter-wave band signal and the launcher 106 can include a cone transceiver (shown in FIG. 3 in more detail) that launches a millimeter-wave band surface wave that propagates as a guided wave traveling along the wire. At utility pole 118, a repeater 108 receives the surface wave and can amplify it and send it forward on the power line. The repeater 108 can also extract a signal from the millimeter-wave band surface wave and shift it down in frequency to its original cellular band frequency (e.g. 1.9 GHz). An antenna can transmit the downshifted signal to mobile device 122. The process can be repeated by repeater 110, antenna 114 and mobile device 124.

Transmissions from mobile devices 122 and 124 can also be received by antennas 112 and 114 respectively. The repeaters 108 and 110 can upshift the cellular band signals to millimeter-wave band (e.g., 60-110 GHz) and transmit the signals as surface wave transmissions over the power line(s) to base station device 104.

Figure 2:
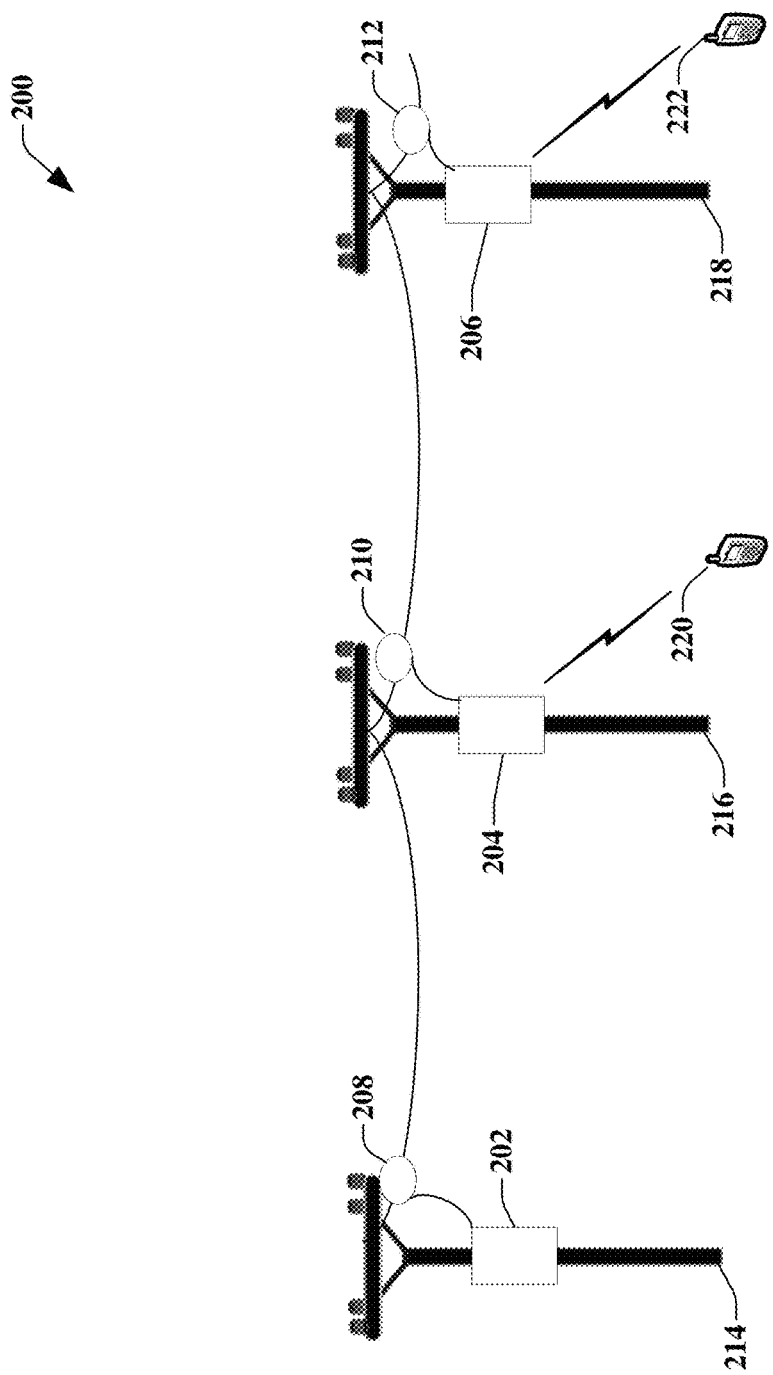
FIG. 2 is a block diagram illustrating an example, non-limiting embodiment of a backhaul system in accordance with various aspects described herein.

Turning now to FIG. 2, a block diagram illustrating an example, non-limiting embodiment of a backhaul system 200 in accordance with various aspects described herein is shown. The embodiment shown in FIG. 2 differs from FIG. 1 in that rather than having a distributed antenna system with base station devices located in one place and having remote antennas, the base station devices themselves are distributed through the system, and the backhaul connection is provided by surface wave transmissions over the power lines.

System 200 includes an RF modem 202 that receives a network connection via a physical or wireless connection to existing network infrastructure. The network connection can be via fiber and/or cable, or by a high-bandwidth microwave connection. The RF modem can receive the network connection and process it for distribution to base station devices 204 and 206. The RF modem 202 can modulate a millimeter-wave band transmission using a protocol such as DOCSIS, and out put the signal to a launcher 208. Launcher 208 can include a cone (shown in FIG. 5 in more detail) that launches a millimeter-wave band surface wave that propagates as a guided wave traveling along the wire.

At utility pole 216, a repeater 210 receives the surface wave and can amplify it and send it forward over the power line to repeater 212. Repeater 210 can also include a modem that extracts the signal from the surface wave, and output the signal to base station device 204. Base station device 204 can then use the backhaul connection to facilitate communications with mobile device 220.

Repeater 212 can receive the millimeter-wave band surface wave transmission sent by repeater 210, and extract a signal via a modem, and output the signal to base station device 206 which can facilitate communications with mobile device 222. The backhaul connection can work in reverse as well, with transmissions from mobile devices 220 and 222 being received by base station devices 204 and 206 which forward the communications via the backhaul network to repeaters 210 and 212. Repeaters 210 and 212 can convert the communications signal to a millimeter-wave band surface wave and transmit it via the power line back to launcher 208, RF modem 202 and on to the mobile network.

Turning now to FIG. 3, a block diagram illustrating an example, non-limiting embodiment of a distributed antenna system 300 is shown. FIG. 3 shows in more detail the base station 104 and launcher 106 described in FIG. 1. A base station device 302 can include a router 304 and a microcell 308 (or picocell, femtocell, or other small cell deployment). The base station device 302 can receive an external network connection 306 that is linked to existing infrastructure. The network connection 306 can be physical (such as fiber or cable) or wireless (high-bandwidth microwave connection). The existing infrastructure that the network connection 306 can be linked to, can in some embodiments be macrocell sites. For those macrocell sites that have high data rate network connections, base station device 302 can share the network connection with the macrocell site.

The router 304 can provide connectivity for microcell 308 which facilitates communications with the mobile devices. While FIG. 3 shows that base station device 302 has one microcell, in other embodiments, the base station device 302 can include two or more microcells. The RF output of microcell 308 can be used to modulate a 60 GHz signal and be connected via fiber to a launcher 318. It is to be appreciated that launcher 318 and repeater 108 include similar functionality, and a network connection 306 can be linked to either launcher 318 or repeater 108 (and 106, 110, and etc.).

Figure 7:
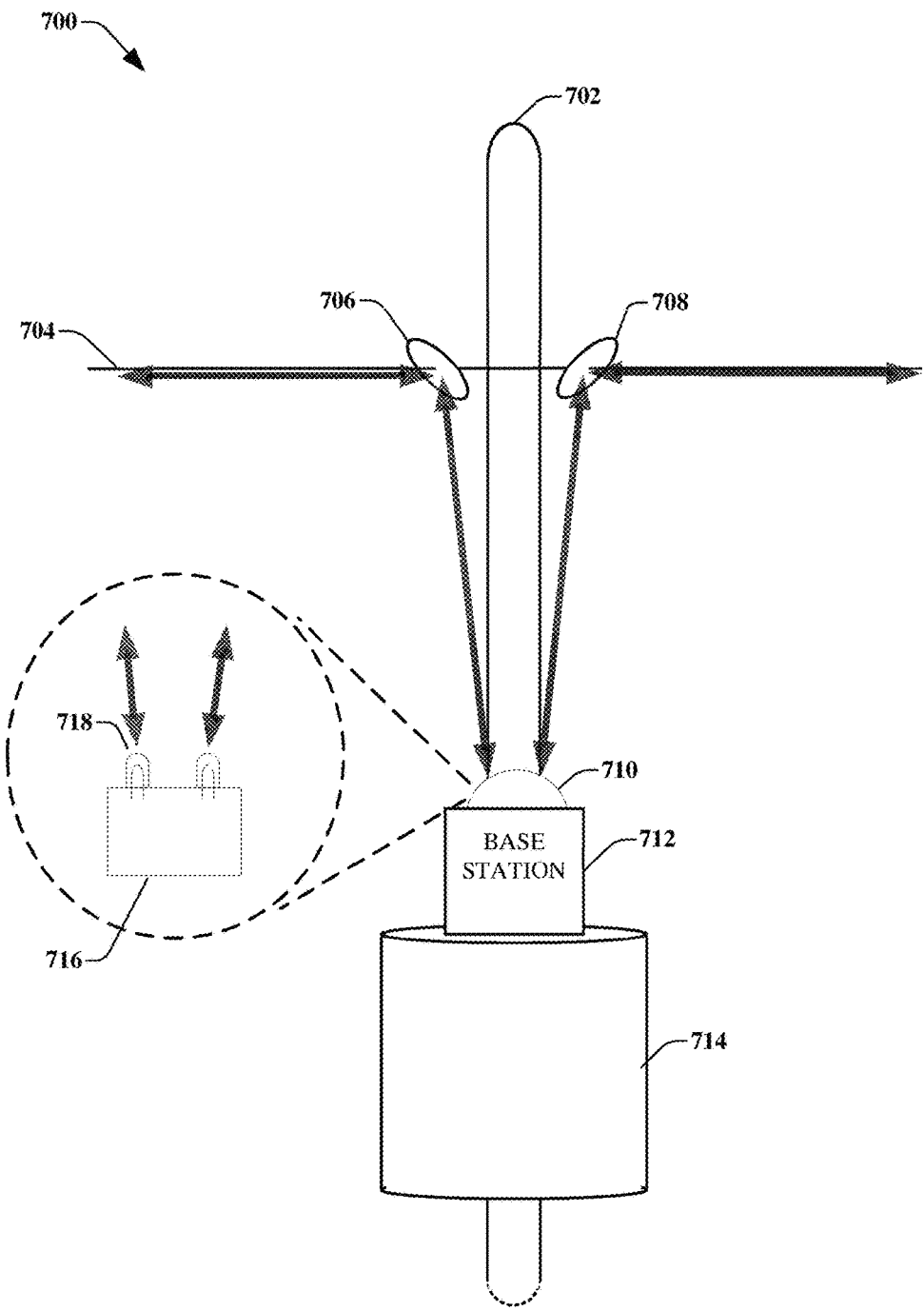
FIG. 7 is a block diagram illustrating an example, non-limiting embodiment of a quasi-optical coupling in accordance with various aspects described herein.

In other embodiments, the base station device 302 can be coupled to launcher 318 by a quasi-optical coupling (shown in more detail in FIG. 7). Launcher 318 includes a millimeter-wave interface 312 that shifts the frequency of the RF output to a millimeter-wave band signal. The signal can then be transmitted as a surface wave transmission by cone transceiver 314 over power line 316.

The cone transceiver 314 can generate an electromagnetic field specially configured to propagate as a guided wave travelling along the wire. The guided wave, or surface wave, will stay parallel to the wire, even as the wire bends and flexes. Bends can increase transmission losses, which are also dependent on wire diameters, frequency, and materials.

The millimeter-wave interface 312 and the cone transceiver 314 can be powered by inductive power supply 310 that receives power inductively from the medium voltage or high voltage power line. In other embodiments, the power can be supplemented by a battery supply.

Turning now to FIG. 4, a block diagram illustrating an example, non-limiting embodiment of a distributed antenna system in accordance with various aspects described herein is shown. System 400 includes a repeater 402 that has cone transceivers 404 and 412, millimeter-wave interfaces 406 and 410, as well an inductive power supply 408 and antenna 414.

Transceiver 404 can receive a millimeter-wave band surface wave transmission sent along a power line. The millimeter-wave interface 406 can convert the signal to an electronic signal in a cable or a fiber-optic signal and forward the signal to millimeter-wave interface 410 and cone transceiver 412 which launch the signal on to the power line as a surface wave transmission. Millimeter-wave interfaces 406 and 410 can also shift the frequency of the signal down and up respectively, between the millimeter-wave band and the cellular band. Antenna 414 can transmit the signal to mobile devices that are in range of the transmission.

Antenna 414 can receive return signals from the mobile devices, and pass them to millimeter-wave interfaces 406 and 410 which can shift the frequency upwards to another frequency band in the millimeter-wave frequency range. Cone transceivers 404 and 412 can then transmit the return signal as a surface wave transmission back to the base station device located near the launcher (e.g. base station device 302).

Referring now to FIG. 5, a block diagram illustrating an example, non-limiting embodiment of a backhaul system 500 in accordance with various aspects described herein is shown. Backhaul system 500 shows in greater detail the RF modem 202 and launcher 208 that are shown in FIG. 2. An RF modem 502 can include a router 504 and a modem 508. The RF modem 502 can receive an external network connection 506 that is linked to existing infrastructure. The network connection 506 can be physical (such as fiber or cable) or wireless (high-bandwidth microwave connection). The existing infrastructure that the network connection 506 can be linked to, can in some embodiments be macrocell sites. Since macrocell sites already have high data rate network connections, RF modem 502 can share the network connection with the macrocell site.

The router 504 and modem 508 can modulate a millimeter-wave band transmission using a protocol such as DOCSIS, and output the signal to a launcher 516. The RF modem 502 can send the signal to the launcher 516 via a fiber or cable link. In some embodiment, RF modem 502 can be coupled to launcher 516 by a quasi-optical coupling (shown in more detail in FIG. 7).

The launcher 516 can include a millimeter-wave interface 512 that shifts the frequency of the RF modem 502 output to a millimeter-wave band signal. The signal can then be transmitted as a surface wave transmission by cone transceiver 514. The cone transceiver 514 can generate an electromagnetic field specially configured to propagate as a guided wave travelling along the wire 518. The guided wave, or surface wave, will stay parallel to the wire, even as the wire bends and flexes. Bends can increase transmission losses, which are also dependent on wire diameters, frequency, and materials.

The millimeter wave interface 512 and the cone transceiver 514 can be powered by inductive power supply 510 that receives power inductively from the medium voltage or high voltage power line. In other embodiments, the power can be supplemented by a battery supply.

FIG. 6 shows a block diagram of an example, non-limiting embodiment of a backhaul system in accordance with various aspects described herein. System 600 includes a repeater 602 that has cone transceivers 604 and 612, millimeter-wave interfaces 606 and 610, as well an inductive power supply 608 and a microcell 614.

Transceiver 604 can receive a millimeter-wave band surface wave transmission sent along a power line. The millimeter-wave interface 606 can convert the signal to an electronic signal in a cable or a fiber-optic signal and forward the signal to millimeter-wave interface 610 and cone transceiver 612 which launch the signal on to the power line as a surface wave transmission. Millimeter-wave interfaces 606 and 610 can also shift the frequency of the signal up and down, between the millimeter-wave band and the cellular band. The millimeter-wave interfaces 606 and 610 can also include multiplexers and demultiplexers that allow for multiplexed signals in the time domain and/or frequency domain. The millimeter-wave interfaces 606 and 610 can also include a modem that can demodulate the signal using a protocol such as DOCSIS. The signal can then be sent to microcell 614 to facilitate communications with a mobile device.

The millimeter wave interfaces 606 and 610 can also include a wireless access point. The wireless access point (e.g., 802.11ac), can enable the microcell 614 to be located anywhere within range of the wireless access point, and does not need to be physically connected to the repeater 602.

FIG. 7 shows a block diagram of an example, non-limiting embodiment of a quasi-optical coupling 700 in accordance with various aspects described herein. Specially trained and certified technicians are required to work with high voltage and medium voltage power lines. Locating the circuitry away from the high voltage and medium voltage power lines allows ordinary craft technicians to install and maintain the circuitry. Accordingly, this example embodiment is a quasi-optical coupler allowing the base station and surface wave transmitters to be detached from the power lines.

At millimeter-wave frequencies, where the wavelength is small compared to the macroscopic size of the equipment, the millimeter-wave transmissions can be transported from one place to another and diverted via lenses and reflectors, much like visible light. Accordingly, reflectors 706 and 708 can be placed and oriented on power line 704 such that millimeter-wave band transmissions sent from transmitter 716 are reflected parallel to the power line, such that it is guided by the power line as a surface wave. Likewise, millimeter-wave band (60 Ghz and greater for this embodiment) surface waves, sent along the power line 704 can be reflected by reflectors 706 and 708 and sent as a collimated beam to the dielectric lens 710 and waveguide 718 on a monolithic transmitter integrated circuit 716 which sends the signal to the base station 712.

The base station 712 and transmitter apparatus 716 can receive power from a transformer 714 that may be part of the existing power company infrastructure.

Figure 8:
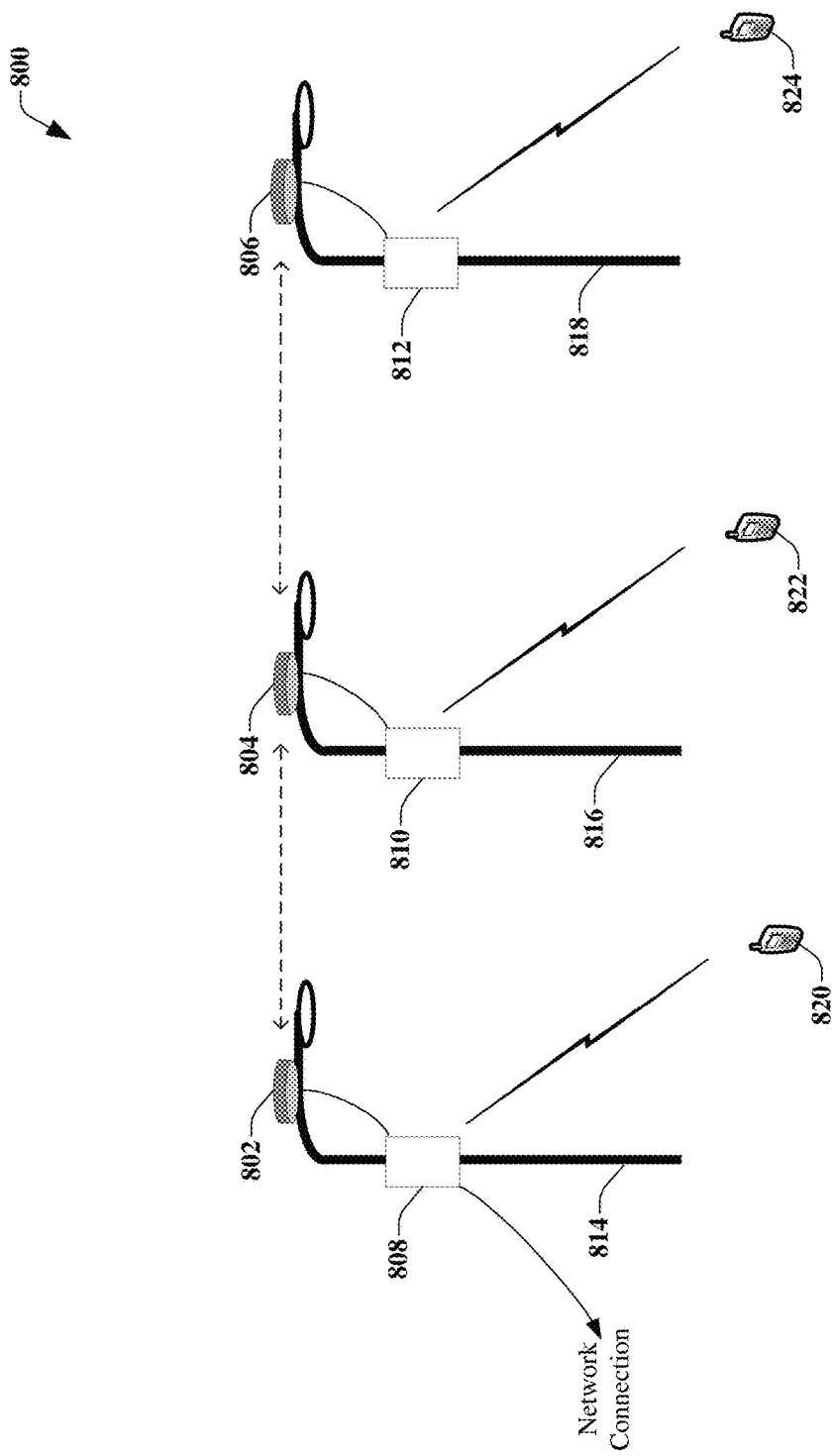
FIG. 8 is a block diagram illustrating an example, non-limiting embodiment of a backhaul system in accordance with various aspects described herein.

Turning now to FIG. 8, a block diagram illustrating an example, non-limiting embodiment of a backhaul system in accordance with various aspects described herein is shown. Backhaul system 800 includes a base station device 808 that receives a network connection via a physical or wireless connection to existing network infrastructure. The network connection can be via fiber and/or cable, or by a high bandwidth line-of-sight microwave connection to a nearby macrocell site. The base station device 808 can include a microcell (or other small cell deployment) that can facilitate communication with mobile device 820.

Radio repeater 802, communicably coupled to base station device 808, can transmit a millimeter band signal to radio repeater 804. Radio repeater 804 can forward the transmission to radio repeater 806 as well, and both radio repeaters 804 and 806 can share the signal with microcells 810 and 812. In this way, the network connection from the existing infrastructure can be distributed to a mesh network of microcells via line of sight millimeter band transmissions by radio repeaters.

In some embodiments, the radio repeaters can transmit broadcasts at frequencies above 100 GHz. A lower gain, broader beamwidth antenna than conventional millimeter-wave radio links provides high availability at short link lengths (~500 ft) while keeping the radio repeaters small and inexpensive.

In some embodiments, the radio repeaters and microcells can be mounted on existing infrastructure such as light poles 814, 816, and 818. In other embodiments, the radio repeaters and microcells can be mounted on utility poles for power lines, buildings, and other structures.

Figure 9:
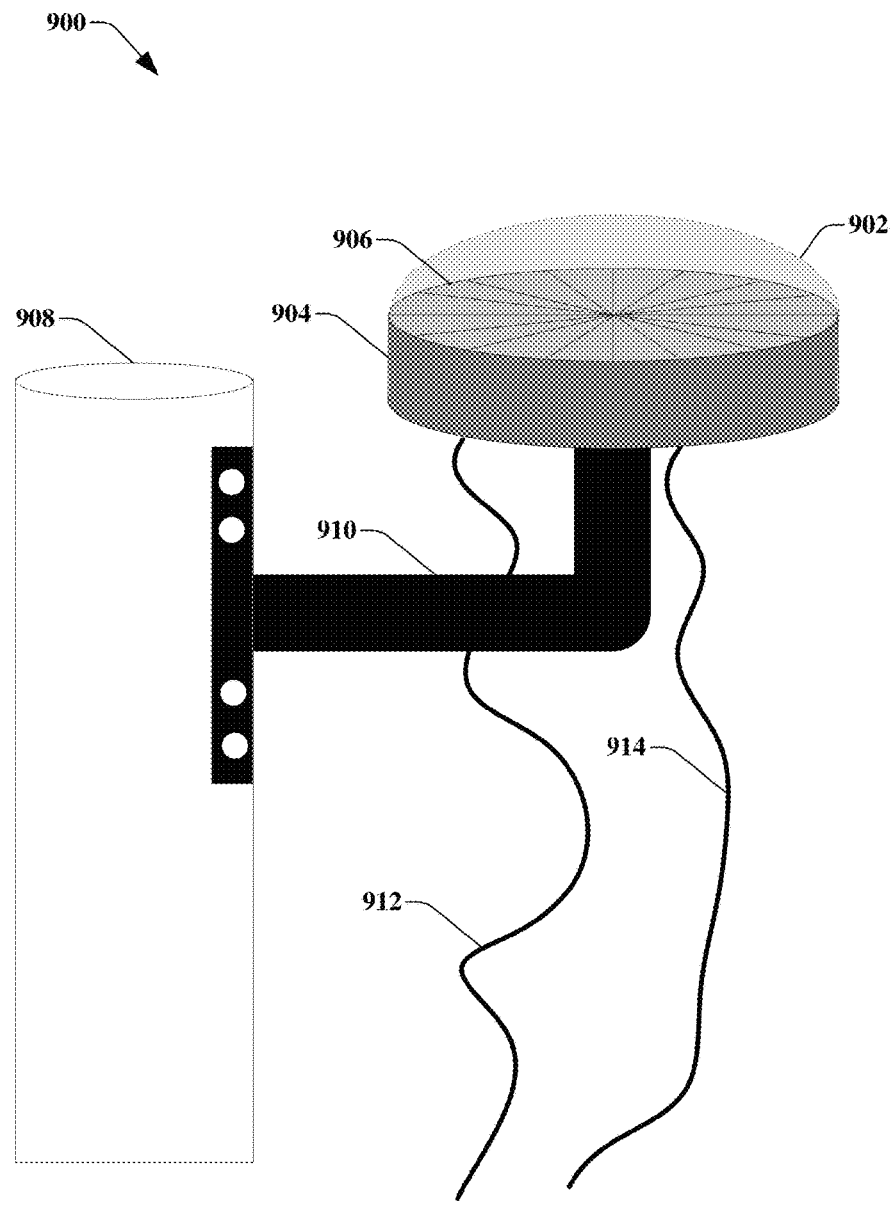
FIG. 9 is a block diagram illustrating an example, non-limiting embodiment of a millimeter band antenna apparatus in accordance with various aspects described herein.

Turning now to FIG. 9, a block diagram illustrating an example, non-limiting embodiment of a millimeter-wave band antenna apparatus 900 in accordance with various aspects described herein is shown. The radio repeater 904 can have a plastic cover 902 to protect the radio antennas 906. The radio repeater 904 can be mounted to a utility pole, light pole, or other structure 908 with a mounting arm 910. The radio repeater can also receive power via power cord 912 and output the signal to a nearby microcell using fiber or cable 914.

In some embodiments, the radio repeater 904 can include 16 antennas. These antennas can be arranged radially, and each can have approximately 24 degrees of azimuthal beamwidth. There can thus be a small overlap between each antennas beamwidths. The radio repeater 904, when transmitting, or receiving transmissions, can automatically select the best sector antenna to use for the connections based on signal measurements such as signal strength, signal to noise ratio, etc. Since the radio repeater 904 can automatically select the antennas to use, in one embodiment, precise antenna alignment is not implemented, nor are stringent requirements on mounting structure twist, tilt, and sway.

In some embodiments, the radio repeater 904 can include a microcell within the apparatus, thus enabling a self-contained unit to be a repeater on the backhaul network, in addition to facilitating communications with mobile devices. In other embodiments, the radio repeater can include a wireless access point (e.g. 802.11ac).

Figure 10:
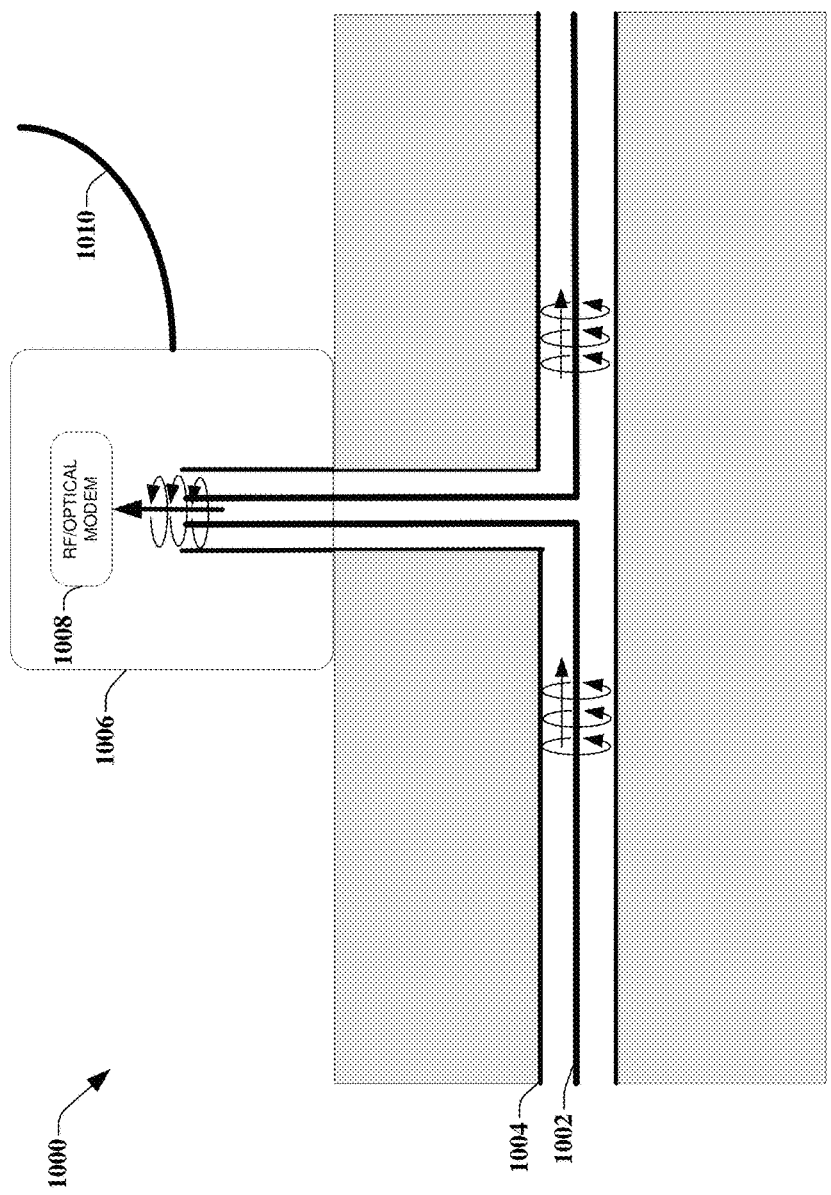
FIG. 10 is a block diagram illustrating an example, non-limiting embodiment of an underground backhaul system in accordance with various aspects described herein.

Turning now to FIG. 10, a block diagram illustrating an example, non-limiting embodiment of an underground backhaul system in accordance with various aspects described herein is shown. Pipes, whether they are metallic or dielectric, can support the transmission of guided electromagnetic waves. Thus the distributed antenna backhaul systems shown in FIGS. 1 and 2, respectively, can be replicated using underground conduits 1004 in place of above ground power lines. The underground conduits can carry power lines or other cables 1002, and at transformer box 1006 an RF/optical modem can convert (modulate or demodulate) the backhaul signal to or from the millimeter-wave (40 GHz or greater in an embodiment). A fiber or cable 1010 can carry the converted backhaul signal to a microcell located nearby.

A single conduit can serve several backhaul connections along its route by carrying millimeter-wave signals multiplexed in a time domain or frequency domain fashion.

Figure 11:
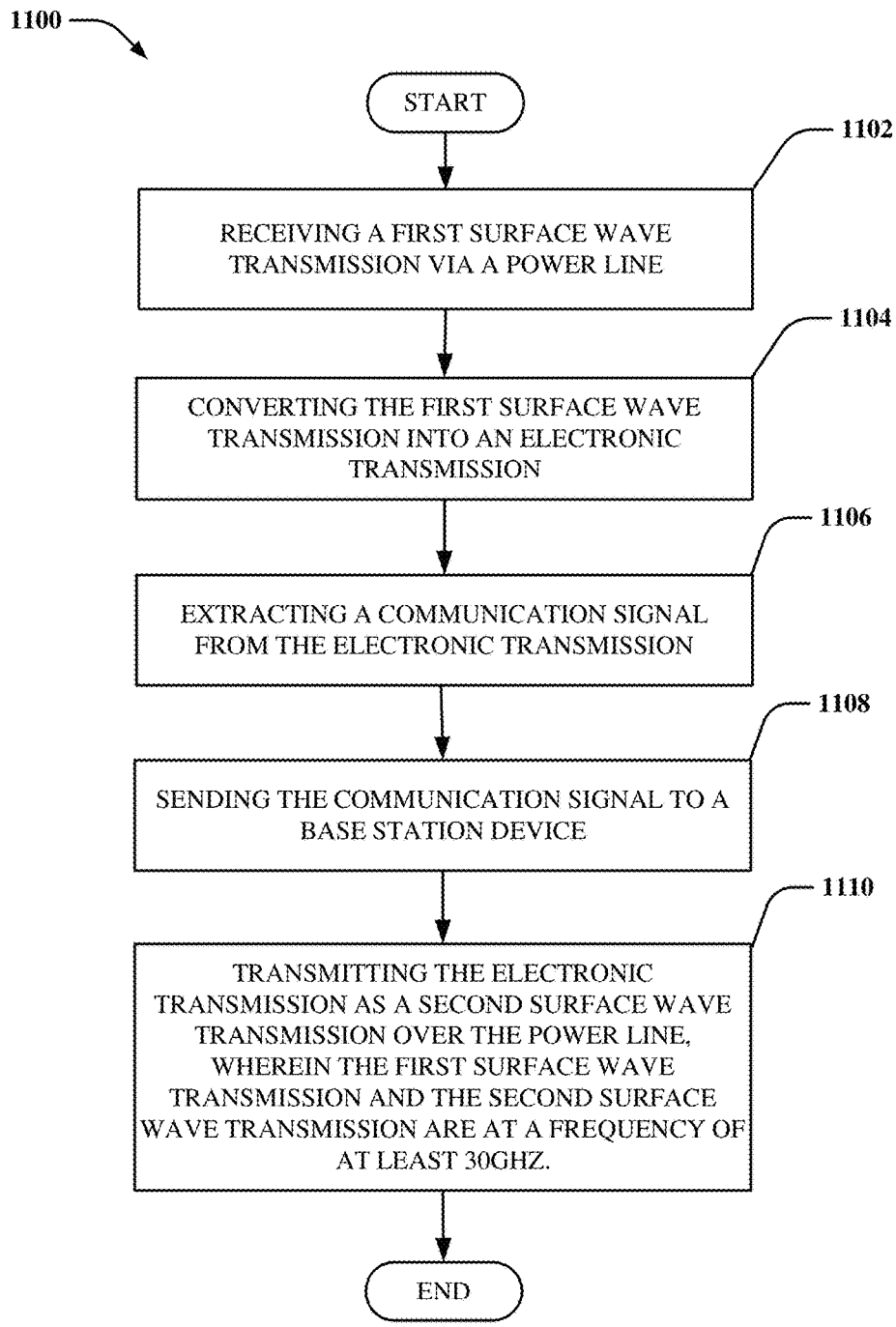
FIG. 11 illustrates a flow diagram of an example, non-limiting embodiment of a method for providing a backhaul connection as described herein.

FIG. 11 illustrates a process in connection with the aforementioned systems. The process in FIG. 11 can be implemented for example by systems 100, 200, 300, 400, 500, 600, 700, and 1000 illustrated in FIGS. 1-7 and 10 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 11 illustrates a flow diagram of an example, non-limiting embodiment of a method for providing a backhaul connection as described herein. At step 1102, a first surface wave transmission is received over a power line. The surface wave transmission can be received by cone transceivers in some embodiments. In other embodiments, reflectors, positioned on the power line can reflect the surface wave to a dielectric lens and waveguide that convert the surface wave into an electronic transmission. At step 1104, the first surface wave transmission is converted into an electronic transmission. The cone transceiver can receive the electromagnetic wave and convert it into an electronic transmission that propagates through a circuit.

At step 1106, a communication signal is extracted from the electronic transmission. The communication signal can be extracted using an RF modem that uses a protocol such as DOCSIS. The RF modem can modulate and demodulate the electronic signal to extract the communication signal. The communication signal can be a signal received from the mobile network, and can be provided to give network connectivity to a distributed base station.

At 1108, the communication signal can be sent to a base station device nearby. The communication can be sent over fiber or cable, or can be sent wirelessly using Wi-Fi (e.g., 802.11ac).

At 1110, the electronic transmission is transmitted as a second surface wave transmission over the power line. A second cone transceiver or reflector can launch the surface wave on to the power line to a next node in the backhaul system. The first surface wave transmission and the second surface wave transmission are at a frequency of at least 30 GHz.

Figure 12:
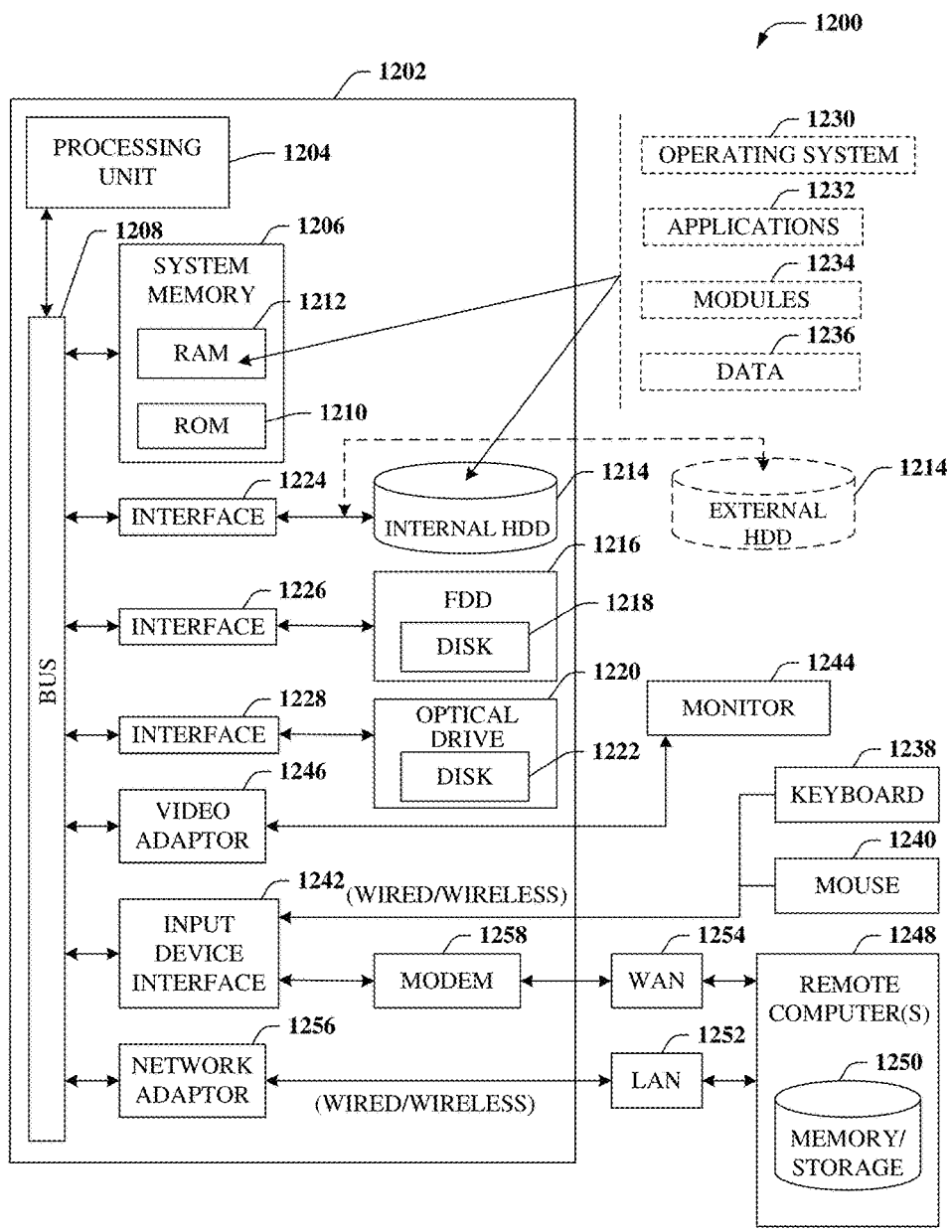
FIG. 12 is a block diagram of an example, non-limiting embodiment of a computing environment in accordance with various aspects described herein.

Referring now to FIG. 12, there is illustrated a block diagram of a computing environment in accordance with various aspects described herein. For example, in some embodiments, the computer can be or be included within the mobile device data rate throttling system 200, 400, 500 and/or 600.

In order to provide additional context for various embodiments of the embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) can include a microphone, an infrared (IR) remote control, a joystick, a game pad, a stylus pen, touch screen or the like. These and other input devices are often connected to the processing unit 1204 through an input device interface 1242 that can be coupled to the system bus 1208, but can be connected by other interfaces, such as a parallel port, an IEEE 1394 serial port, a game port, a universal serial bus (USB) port, an IR interface, etc.

A monitor 1244 or other type of display device can be also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also include a wireless AP disposed thereon for communicating with the wireless adapter 1256.

When used in a WAN networking environment, the computer 1202 can include a modem 1258 or can be connected to a communications server on the WAN 1254 or has other means for establishing communications over the WAN 1254, such as by way of the Internet. The modem 1258, which can be internal or external and a wired or wireless device, can be connected to the system bus 1208 via the input device interface 1242. In a networked environment, program modules depicted relative to the computer 1202 or portions thereof, can be stored in the remote memory/storage device 1250. It will be appreciated that the network connections shown are example and other means of establishing a communications link between the computers can be used.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

Figure 13:
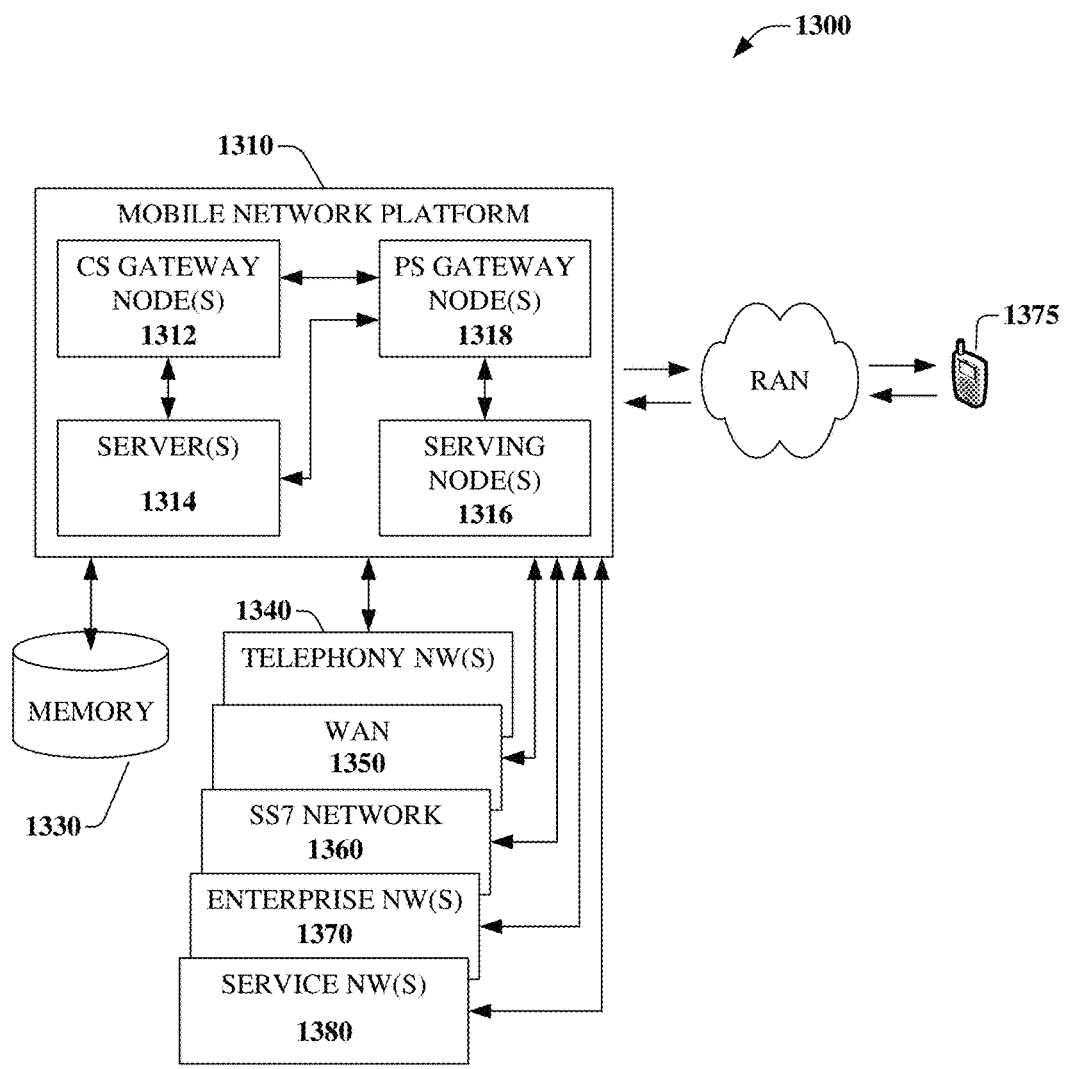
FIG. 13 is a block diagram of an example, non-limiting embodiment of a mobile network platform in accordance with various aspects described herein.

FIG. 13 presents an example embodiment 1300 of a mobile network platform 1310 that can implement and exploit one or more aspects of the disclosed subject matter described herein. Generally, wireless network platform 1310 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1310 can be included in telecommunications carrier networks, and can be considered carrier-side components as discussed elsewhere herein. Mobile network platform 1310 includes CS gateway node(s) 1312 which can interface CS traffic received from legacy networks like telephony network(s) 1340 (e.g., public switched telephone network (PSTN), or public land mobile network (PLMN)) or a signaling system #7 (SS7) network 1370. Circuit switched gateway node(s) 1312 can authorize and authenticate traffic (e.g., voice) arising from such networks. Additionally, CS gateway node(s) 1312 can access mobility, or roaming, data generated through SS7 network 1370; for instance, mobility data stored in a visited location register (VLR), which can reside in memory 1330. Moreover, CS gateway node(s) 1312 interfaces CS-based traffic and signaling and PS gateway node(s) 1318. As an example, in a 3GPP UMTS network, CS gateway node(s) 1312 can be realized at least in part in gateway GPRS support node(s) (GGSN). It should be appreciated that functionality and specific operation of CS gateway node(s) 1312, PS gateway node(s) 1318, and serving node(s) 1316, is provided and dictated by radio technology(ies) utilized by mobile network platform 1310 for telecommunication.

In addition to receiving and processing CS-switched traffic and signaling, PS gateway node(s) 1318 can authorize and authenticate PS-based data sessions with served mobile devices. Data sessions can include traffic, or content(s), exchanged with networks external to the wireless network platform 1310, like wide area network(s) (WANs) 1350, enterprise network(s) 1370, and service network(s) 1380, which can be embodied in local area network(s) (LANs), can also be interfaced with mobile network platform 1310 through PS gateway node(s) 1318. It is to be noted that WANs 1350 and enterprise network(s) 1360 can embody, at least in part, a service network(s) like IP multimedia subsystem (IMS). Based on radio technology layer(s) available in technology resource(s) 1317, packet-switched gateway node(s) 1318 can generate packet data protocol contexts when a data session is established; other data structures that facilitate routing of packetized data also can be generated. To that end, in an aspect, PS gateway node(s) 1318 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1300, wireless network platform 1310 also includes serving node(s) 1316 that, based upon available radio technology layer(s) within technology resource(s) 1317, convey the various packetized flows of data streams received through PS gateway node(s) 1318. It is to be noted that for technology resource(s) 1317 that rely primarily on CS communication, server node(s) can deliver traffic without reliance on PS gateway node(s) 1318; for example, server node(s) can embody at least in part a mobile switching center. As an example, in a 3GPP UMTS network, serving node(s) 1316 can be embodied in serving GPRS support node(s) (SGSN).

For radio technologies that exploit packetized communication, server(s) 1314 in wireless network platform 1310 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1310. Data streams (e.g., content(s) that are part of a voice call or data session) can be conveyed to PS gateway node(s) 1318 for authorization/authentication and initiation of a data session, and to serving node(s) 1316 for communication thereafter. In addition to application server, server(s) 1314 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1310 to ensure network's operation and data integrity in addition to authorization and authentication procedures that CS gateway node(s) 1312 and PS gateway node(s) 1318 can enact. Moreover, provisioning server(s) can provision services from external network(s) like networks operated by a disparate service provider; for instance, WAN 1350 or Global Positioning System (GPS) network(s) (not shown). Provisioning server(s) can also provision coverage through networks associated to wireless network platform 1310 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1375.

It is to be noted that server(s) 1314 can include one or more processors configured to confer at least in part the functionality of macro network platform 1310. To that end, the one or more processor can execute code instructions stored in memory 1330, for example. It is should be appreciated that server(s) 1314 can include a content manager 1315, which operates in substantially the same manner as described hereinbefore.

In example embodiment 1300, memory 1330 can store information related to operation of wireless network platform 1310. Other operational information can include provisioning information of mobile devices served through wireless platform network 1310, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1330 can also store information from at least one of telephony network(s) 1340, WAN 1350, enterprise network(s) 1360, or SS7 network 1370. In an aspect, memory 1330 can be, for example, accessed as part of a data store component or as a remotely connected memory store.

In order to provide a context for the various aspects of the disclosed subject matter, FIG. 13, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1320 (see below), non-volatile memory 1322 (see below), disk storage 1324 (see below), and memory storage 1346 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)$=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a first coupler;
   a second coupler;
   an antenna;
   a memory to store instructions; and
   a processor, communicatively coupled to the memory, to facilitate execution of the instructions to perform operations, the operations comprising:
   receiving, by the antenna, a first wireless signal that is converted to a first guided electromagnetic wave that propagates along a first transmission medium, wherein the first wireless signal conveys a modulated signal generated by a first communication device;
   receiving, by the first coupler, the first guided electromagnetic wave guided by the first transmission medium;
   converting the first guided electromagnetic wave to an electrical signal; and
   converting the electrical signal to a second guided electromagnetic wave, the second guided electromagnetic wave generated on a surface of a second transmission medium utilizing the second coupler, wherein the second guided electromagnetic wave conveys the modulated signal, and wherein the second guided electromagnetic wave is directed to another system that converts the second guided electromagnetic wave to a second wireless signal conveying the modulated signal, and wherein the second wireless signal is directed to a second communication device.

2. The system of claim 1, wherein the first guided electromagnetic wave and the second guided electromagnetic wave propagate in a same longitudinal direction.

3. The system of claim 1, wherein the electrical signal is converted to the second guided electromagnetic wave by a transmitter.

4. The system of claim 1, wherein the processor comprises a plurality of processors operating in a distributed processing environment.

5. The system of claim 1, wherein the modulated signal comprises speech data.

6. The system of claim 1, wherein the first guided electromagnetic wave is received by a receiver and converted to the electrical signal by the receiver.

7. The system of claim 1, wherein the second transmission medium comprises a portion of the first transmission medium.

8. The system of claim 1, wherein the system comprises a waveguide system that is a component of a distributed antenna system.

9. The system of claim 1, wherein the first guided electromagnetic wave and the second guided electromagnetic wave have an operating frequency in a millimeter-wave frequency range.

10. A method, comprising:
receiving, by an antenna of a waveguide system, a first wireless signal that is converted to a first guided electromagnetic wave guided by a first transmission medium, wherein the first wireless signal conveys a modulated signal generated by a first communication device;
receiving, by a first coupler of the waveguide system, the first guided electromagnetic wave guided by the first transmission medium;
converting, by the waveguide system, the first guided electromagnetic wave to an electrical signal; and
converting, by the waveguide system, the electrical signal to a second guided electromagnetic wave, the second guided electromagnetic wave being coupled to a second transmission medium by a second coupler of the waveguide system, wherein the second guided electromagnetic wave conveys the modulated signal.

11. The method of claim 10, wherein the waveguide system comprises a receiver for receiving the first guided electromagnetic wave and for converting the first guided electromagnetic wave to the electrical signal.

12. The method of claim 10, wherein the waveguide system further comprises a transmitter for converting the electrical signal to the second guided electromagnetic wave.

13. The method of claim 10, wherein the second transmission medium comprises a portion of the first transmission medium.

14. The method of claim 10, wherein the second guided electromagnetic wave is directed to another waveguide system that converts the second guided electromagnetic wave to a second wireless signal including the modulated signal.

15. The method of claim 14, wherein the second wireless signal is directed to a second communication device for processing the modulated signal.

16. The method of claim 10, wherein the antenna is part of a distributed antenna system.

17. A method, comprising:
receiving, by an antenna, a first wireless signal that is converted to a first guided electromagnetic wave guided by a surface of a first dielectric transmission medium, wherein the first wireless signal conveys a modulated signal generated by a first communication device;
receiving, by a first coupler, the first guided electromagnetic wave guided by the first dielectric transmission medium;
converting, by a receiver, the first guided electromagnetic wave to an electrical signal; and
converting, by a transmitter, the electrical signal to a second guided electromagnetic wave, the second guided electromagnetic wave being coupled to a second dielectric transmission medium by a second coupler, wherein the second guided electromagnetic wave conveys the modulated signal.

18. The method of claim 17, wherein the first coupler comprises a first dielectric coupler.

19. The method of claim 17, wherein the second coupler comprises a second dielectric coupler.

20. The method of claim 19, wherein the second guided electromagnetic wave is directed to a system that converts the second guided electromagnetic wave to a second wireless signal including the modulated signal, and wherein the second wireless signal is directed to a second communication device.

* * * * *